United States Patent [19]

Wolff

[11] 4,386,522
[45] Jun. 7, 1983

[54] POSITION SENSOR FOR FUEL INJECTION APPARATUS

[76] Inventor: George D. Wolff, Post Office Drawer 9407, Winter Haven, Fla. 33880

[21] Appl. No.: 285,286

[22] Filed: Jul. 20, 1981

[51] Int. Cl.$^3$ .......................................... G01M 15/00
[52] U.S. Cl. ................................................. 73/119 A
[58] Field of Search ...................... 73/119 A, DIG. 3; 330/6

[56] References Cited

U.S. PATENT DOCUMENTS 3,214,609 10/1965 Drew et al. .................... 330/6 X
3,412,602 11/1968 Rush et al. .................... 73/119 A

*Primary Examiner*—Jerry W. Myracle

*Attorney, Agent, or Firm*—Duckworth, Allen, Dyer & Pettis

[57] ABSTRACT

A sensor for detecting the position of a fuel injection element such as a needle injector, poppet valve, or the like in fuel injection apparatus of an internal combustion engine includes a header of an electrically insulating material having opposing first and second surfaces. The sensor is provided with plural conductive leads, each coupled to the first surface of the header, and a Hall effect detector mounted on the second surface of the header for detecting a magnetic field and changes therein responsive to movement of the fuel injector element. Metallization between the first and second surfaces interconnects the leads to the detector, and the header, leads and detector are encapsulated and dimensioned for insertion into and removal out of the passageway in the fuel injection apparatus.

25 Claims, 9 Drawing Figures

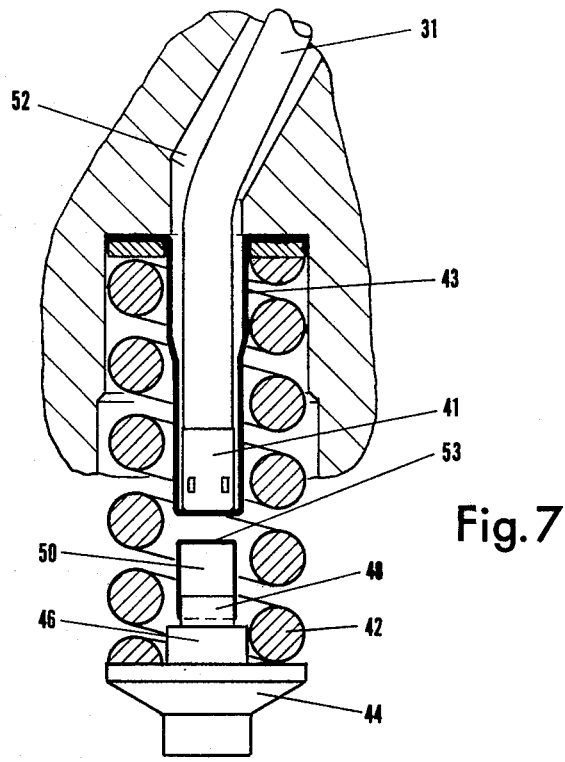
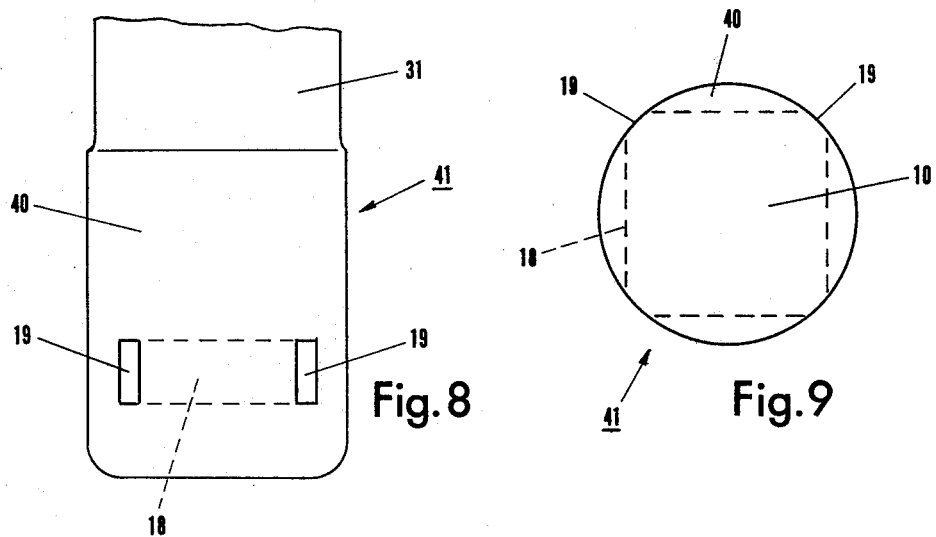

POSITION SENSOR FOR FUEL INJECTION APPARATUS

BACKGROUND OF THE INVENTION

1. Field of the Invention

The present invention relates generally to internal combustion engines, and more particularly relates to techniques for sensing the position of a needle or poppet valve in order to maximize the efficiency of engine operation and reduce unwanted exhaust emissions.

2. Description of the Prior Art

Diesel engines typically employ needle valves which are open and closed at timed intervals to inject desired amounts of fuel into the cylinder for combustion. In order to maximize fuel efficiency and minimize undesirable exhaust emissions, it is necessary to detect the opening of the needle valve in relation to the engine crankshaft position. The opening of the needle valve can then be set or controlled in timed relationship to the engine crankshaft position.

Known needle valves generally include a needle and a related needle seat. When the needle is in contact with the seat, the valve is closed. When the needle is lifted off the seat, the valve opens and fuel is metered through orifices into the engine cylinder. The initial displacement between the needle and its corresponding seat determine the beginning of injection. It is necessary to time or control the initial displacement of the needle from the seat relative to the rotational position of the engine crankshaft, in order to maximize fuel efficiency, and at the same time reduce undesirable emissions.

It is known to determine timing by reference to visual markings on the engine flywheel. Techniques have also been developed to electronically measure the injection timing by determining needle position using inductive or capacitor devices positioned within a fuel injector nozzle holder.

Creative Tool Company of Lyons, Ill. presently manufactures a product known as the "Diesel TacTime CT 4000". This device utilizes a split-nut transducer which is installed on an engine cylinder fuel line at either the injection pump or at the nozzle. Mechanical strains produced by pulses of fuel through the fuel line create a mechanical displacement of the line which is detected by the transducer.

SUMMARY OF THE INVENTION

The present invention contemplates a sensor for detecting the opening of a fuel injection means such as a needle injector, poppet valve or the like in fuel injection apparatus of an internal combustion engine. The sensor comprises a header of an electrically insulating material having opposed first and second surfaces, and plural conductive leads, each lead separately coupled to the first surface of the header. Sensing means, such as a Hall effect detector, is mounted upon the second surface of the header for detecting a magnetic field and changes therein responsive to movement of the fuel injection means (such as the needle valve, or poppet valve) in an internal combustion engine. Metallization means between the first and second surfaces provide interconnection between the leads and the sensor. The leads, header and detector are all encapsulated, and are dimensioned for insertion into and out of a passageway in fuel injection apparatus including the fuel injection means.

In the preferred embodiment of the present invention, the conductive leads comprise rigid pins adapted to withstand the high mechanical stresses experienced in the adverse environment of engine operation, and are further capable of withstanding repeated removal and reinsertion of the sensor into the fuel injection apparatus.

Further, in accordance with the preferred embodiment, the sensor is dimensioned to pass through a passageway in the fuel injector apparatus, the insulating encapsulating material and the header defining means which contact the passageway through which the sensor apparatus is positioned.

THE DRAWING

FIG. 7 illustrates a portion of a fuel injector for an internal combustion engine, as employing the sensor of the present invention.

FIGS. 8 and 9 are side and bottom views, respectively, of an encapsulated sensor in accordance with the present invention.

DETAILED DESCRIPTION

Figure 1:
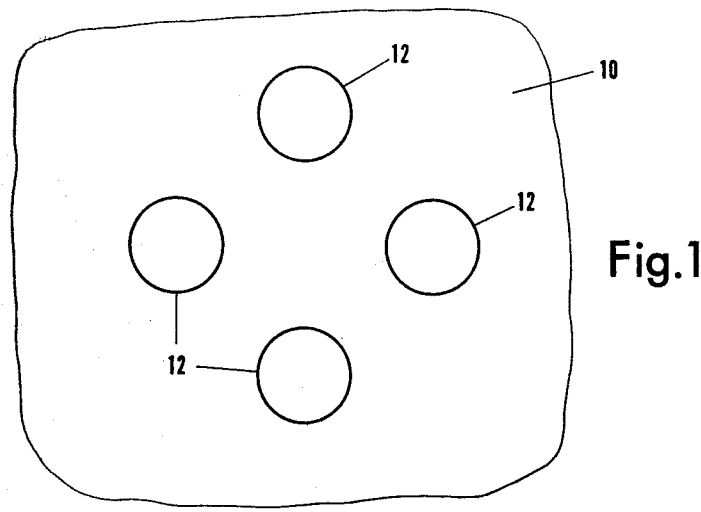
FIGS. 1-3 illustrate top plan views of steps during the manufacture of the sensor of the present invention.

A detailed description of the preferred embodiment of the present invention will now be described with reference to the Drawing.

Figure 2:
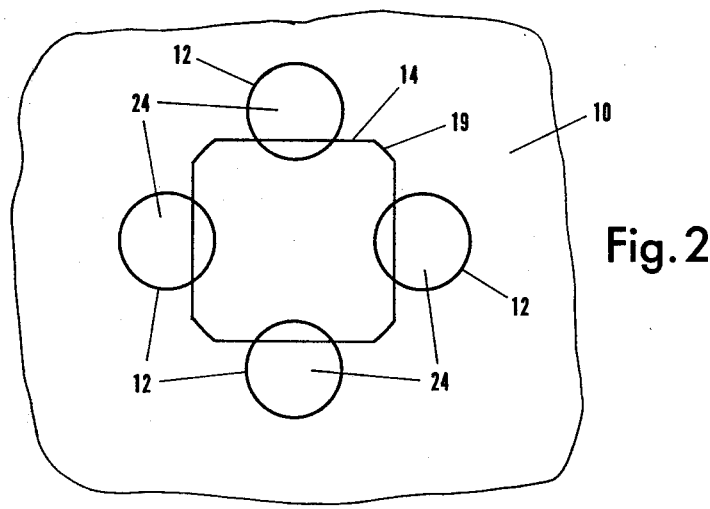

The sensor employs an insulating header, the various features of which are best described with respect to its manufacture. Noting FIGS. 1-3, manufacture is initiated with a header strip (10) of an insulating material, such as alumina, through which spaced holes (12) are punched. It will be understood that a number of units may be manufactured simultaneously with known microcircuit technology from the same strip of insulating material. However, in FIGS. 1 and 2, only the manufacture of a single header is shown.

Figure 3:
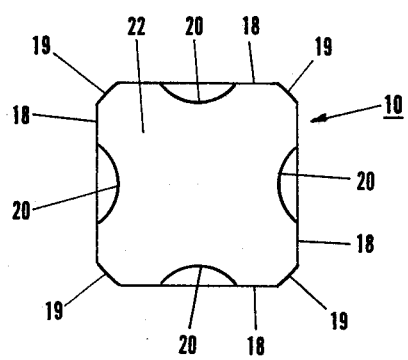

After the punching of the holes (12), the header strip (10) is subjected to conventional cutting and metallizing operations to define the desired header usable for insertion into a fuel injection system. The resulting header structure (10) shown in FIG. 3 has four equal sides (18), and four vias (20) each having metallization (24) therein. The cut (14) (FIG. 2) defines four radial corners (19), the purpose of which will be described in greater detail below. As thus manufactured, the header (10) of FIG. 3 is adapted for further operations to manufacture a sensor specifically for use with fuel injection apparatus in an internal combustion engine.

Figure 4:
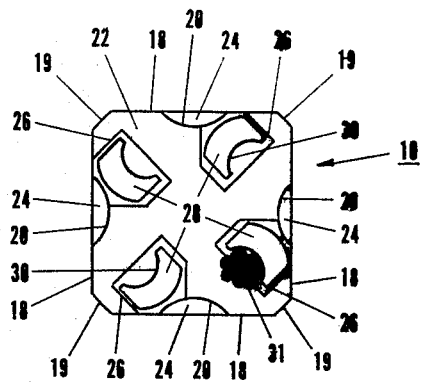
FIG. 4 is a top view of the sensor of the present invention, with the encapsulating resin omitted.
Figure 5:
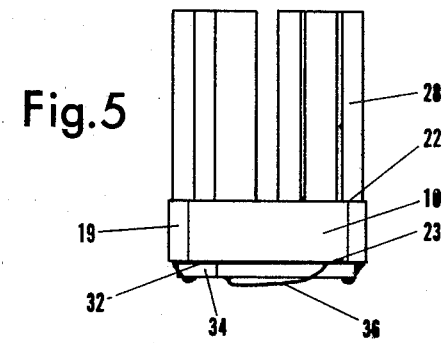
FIG. 5 is a side view of FIG. 4.
Figure 6:
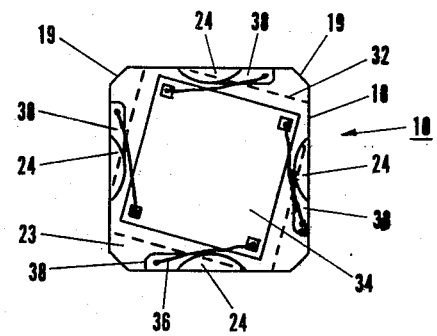
FIG. 6 is a bottom view of FIG. 4, showing the arrangement of the Hall Effect chip in the sensor.

Noting FIGS. 4, 5, and 6, the upper surface (22) of the header (10) is provided with four metallized pads (26) in contact with the metallization (24) in the vias (20). These metal pads (26) may be deposited by known metallization deposition techniques. Four rigid metal pins (28), preferably formed of a steel alloy such as Kovar, are each brazed to one of the metallized pads (26) on the first surface (22). Preferably, each pin (28) includes a groove (30) therein permitting the location of stripped end (31) of flexible strands of an insulated multi-strand lead wire (31) to be welded to each pin (28) in the groove (30). While only one of the wires (31) is shown in the groove (30) of a single rigid pin (28) in FIG. 3, it will be understood that a flexible wire is connected to each of the pins (28).

Reference is now made to FIGS. 5 and 6. Metallization pads (38) are likewise deposited on the opposing surface (23) of the header (10). An insulating layer (32), preferably also of alumina, is deposited on that surface (23). A Hall effect detector chip (34) is bonded to the insulating layer (32) and carried by the surface (23) of the header (10). Connecting bond wires (36) interconnect each metallization pad (38) with a corresponding pad on the Hall effect chip (34).

As shown in FIGS. 8 and 9, the sensor (41) includes an encapsulating resin (40) which is shaped as a cylinder with the periphery thereof lying flush with the radial corners (19). The corners (19) may engage the mold sides during encapsulation, and the corners (19) and encapsulation (40) in turn serve as a guide for the entire sensor (41) as it is inserted through a central passageway (52) (FIG. 7) of a fuel injector or poppet valve. A typical passageway through which the sensor (41) of this invention may be inserted includes the passageway (52) disclosed in my co-pending application, U.S. Ser. No. 241,682, the specification and drawing of which are incorporated here by reference.

FIG. 7 illustrates the sensor (41) fitted in the passageway (52) corresponding to the passageway in the fuel injector nozzle disclosed in my above-identified earlier patent application (referred to there with the reference numeral (10)), and is positioned in the bottom of that passageway (52) in a holder (43) of a nonmagnetic material, preferably stainless steel. The nozzle holder includes a nozzle holder spring (42) and a spring seat (44) in FIG. 7. The seat (44) includes a spring centering plug (46) having a smaller diameter extension (48) thereon. A samarium cobalt magnet (50) is positioned on top of the extension (48). A non-magnetic cap (53) preferably formed of stainless steel, is fitted over the magnet (50), and is welded or brazed to the periphery of the extension (48). The magnet (50) may be fixed within the cavity of the cap (52) with a suitable potting compound.

There has thus been described a unique and facile sensor for detecting the opening of a fuel injection valve to improve engine efficiency and minimize engine emissions.

I claim:

1. A sensor for detecting the position of fuel injection means such as a needle injector, poppet valve or the like in fuel injection apparatus of an internal combustion engine, said sensor comprising:
    (a) a header of an electrically insulating material having opposing first and second surfaces;
    (b) plural conductive leads, each separately coupled to said first surface of said header;
    (c) sensing means mounted upon said second surface for detecting a magnetic field and changes therein responsive to movement of the fuel injection means, such as a needle injector or poppet valve in an internal combustion engine;
    (d) metallization means between said first and second surfaces for interconnecting said leads with said sensing means;
    (e) encapsulating means about said header, leads and sensing means; and wherein
    (f) said encapsulated sensor is dimensioned for insertion into and out of said fuel injection apparatus including said fuel injection means.

2. The sensor recited in claim 1 wherein each said conductive lead comprises a rigid pin and a conductive wire coupled thereto.

3. The sensor recited in claim 2 wherein each pin comprises a groove therein, with said wire electrically coupled to said pin in said groove.

4. The sensor recited in claim 2 further comprising plural metallized pads on said first surface, each pin brazed to one of said pads.

5. The sensor recited in claim 1 wherein said header includes radial corners, said radial corners lying flush with the outer periphery of said encapsulation means.

6. The sensor recited in claim 5 wherein said header further defines other surfaces between said first and second surfaces and each other surface corresponding to one of said conductive leads.

7. The sensor recited in claim 6 wherein said metallization means includes a metal layer along each said other surface.

8. The sensor recited in claim 7 wherein said encapsulating means surrounds each said other surface and the corresponding metal layer.

9. The sensor recited in claim 8 wherein each said other surface has an indentation therein, with said metal layer disposed in said indentation.

10. The sensor recited in claim 9 wherein said metallization means further comprises plural pairs of opposing conductive pads on said first and second surfaces and contiguous with a corresponding metal layer for facilitating electrical conduction between one lead and a corresponding pair of said conductive pads.

11. The sensor recited in claim 10 wherein said sensing means comprises a Hall effect detector, and further comprising conduction means between said Hall effect detector and said conductive pads on said second surface.

12. The sensor recited in claim 11 wherein said encapsulating means comprises a resinous insulating material.

13. The sensor recited in claim 11 further comprising an insulating layer between said second surface and said sensor.

14. A fuel delivery system for an internal combustion engine comprising:
    (a) a fuel injector body having movable injection means such as an injector needle, poppet valve or the like for delivering fuel to a piston for combustion responsive to movement of said element;
    (b) magnetic means with said fuel injection element;
    (c) said injector body having a passageway extending therethrough and terminating short of said magnetic means;
    (d) a removable magnetic sensor dimensioned to pass through said passageway, said sensor comprising an insulating header having a surrounding insulating and encapsulating material, said header having radial corners flush with the outer periphery of said encapsulating material whereby said radial corners guide said sensor during movement through said passageway; and wherein
    (e) said sensor detects changes in the magnetic field affected by movement of said injection means.

15. The fuel delivery system recited in claim 14 wherein said magnetic sensor includes a Hall effect detector.

16. The fuel delivery system recited in claim 14 wherein said magnetic sensor further comprises conductive means including rigid pins extending outward from said header when said sensor is positioned in said passageway.

17. The fuel delivery system recited in claim 16 wherein said conductive means further comprises flexible, insulated lead wires, each joined with a corresponding one of said rigid pins and adapted to extend out of said passageway when said sensor is positioned within said passageway.

18. The fuel delivery system recited in claim 16 wherein said header comprises first and second opposed surfaces, with said radial corners extending substantially normal to said surfaces.

19. The fuel delivery system recited in claim 18 wherein said rigid pins are brazed to said header at said first surface.

20. The fuel delivery system recited in claim 19 wherein said sensor further comprises a magnetic detector upon said second surface.

21. The fuel delivery system recited in claim 20 further comprising metallization means between said first and second surfaces for conductive connection between said pins and said detector.

22. The fuel delivery system recited in claim 21 further comprising an encapsulating material surrounding said header and covering said conductive connections.

23. A fuel delivery system for an internal combustion engine, comprising:
   (a) a fuel injector housing having a movable injector element such as an injection needle, poppet valve or the like for delivery of fuel to a piston engine for combustion responsive to movement of said element;
   (b) magnetic means movable with said fuel injection element;
   (c) said injector housing having a passageway extending through and terminating in proximity to and spaced from said magnetic means;
   (d) a removable magnetic sensor dimensioned to pass through said passageway, said sensor comprising a header having plural, rigid conductors extending outwardly through said passageway when said header is positioned therein; and wherein
   (e) said sensor detects changes in the magnetic field affected by movement of said injector element.

24. The fuel delivery system recited in claim 23 further comprising conductive means including flexible lead wires coupled with said rigid pins and extending outwardly from said header when said sensor is positioned in said passageway.

25. The fuel delivery system recited in claim 23 further comprising a non-magnetic cap over said magnetic means.

* * * * *